United States Patent
Lin (10) Patent No.: US 12,386,514 B2
(45) Date of Patent: Aug. 12, 2025

(54) SOLID-STATE STORAGE DEVICE AND METHOD FOR MAINTAINING PERFORMANCE THEREOF

(71) Applicant: KIOXIA CORPORATION, Tokyo (JP)

(72) Inventor: Jia-Hao Lin, Hsinchu (TW)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/678,420

(22) Filed: May 30, 2024

(65) Prior Publication Data

US 2025/0077083 A1    Mar. 6, 2025

(30) Foreign Application Priority Data

Sep. 4, 2023  (CN) .......................... 202311134450.5
Sep. 4, 2023  (TW) ................................. 112133512

(51) Int. Cl.
  *G06F 3/06*    (2006.01)
(52) U.S. Cl.
  CPC .......... *G06F 3/0613* (2013.01); *G06F 3/0629* (2013.01); *G06F 3/0679* (2013.01)
(58) Field of Classification Search
  CPC ..... G06F 3/0613; G06F 3/0629; G06F 3/0679
  See application file for complete search history.

(56) References Cited

U.S. PATENT DOCUMENTS 11,586,385 B1* 2/2023 Lercari ............... G06F 12/0246
11,743,201 B1* 8/2023 Azulay ............... H04L 47/6215
                                                        370/235
2003/0177296 A1* 9/2003 Kurth ................. G06F 13/3625
                                                        710/244
2013/0212319 A1* 8/2013 Hida .................. G06F 12/0246
                                                        711/103
2019/0278515 A1* 9/2019 Wells ...................... G06F 3/064
2021/0279002 A1  9/2021 Chen et al.

OTHER PUBLICATIONS

Huffman; NVM Express Revision 1.0e; printed Jan. 23, 2013 (Year: 2013).*
Combined Office Action and Search Report issued on Jul. 29, 2024, in corresponding Taiwanese Application No. 112133512, 10 pages (with partial English-language translation).

* cited by examiner

*Primary Examiner* — Prasith Thammavong
(74) *Attorney, Agent, or Firm* — Maier & Maier, PLLC (57) ABSTRACT

A solid-state storage device is provided, which is electrically connected to a host. The solid-state storage device includes a controller, a volatile memory, and a non-volatile memory. The controller divides the non-volatile memory into a plurality of functional regions. The controller sets a functional-region weight value corresponding to a priority of each functional region, and uses a weighted round robin mechanism to perform a number of access commands for each functional region according to the functional-region weight value of each functional region. The controller sets a submission-queue weight value corresponding to each submission queue within each functional region. In response to a specific submission queue within a specific functional region among the plurality of functional regions being lower than a performance threshold, the controller increases the submission-queue weight value corresponding to the specific submission queue to maintain the specific submission queue at a predetermined performance.

12 Claims, 7 Drawing Sheets

SOLID-STATE STORAGE DEVICE AND METHOD FOR MAINTAINING PERFORMANCE THEREOF

CROSS-REFERENCE TO RELATED APPLICATIONS

The present application is based on, and claims priority from, Taiwan Application Ser. No. 112133512, filed on Sep. 4, 2023, and China Application Serial Number 202311134450.5, filed on Sep. 4, 2023, the present disclosures of which are hereby incorporated by reference in their entirety.

FIELD OF THE PRESENT DISCLOSURE

The present disclosure relates to solid-state storage devices, and, in particular, a solid-state storage device and a method for maintaining performance thereof.

BACKGROUND

Solid-state storage devices utilizing non-volatile memory have become increasingly prevalent in various computer systems as technology has advanced. However, the conventional single-root input/output virtualization (SR-IOV) architecture can only calculate the performance of each endurance group in the non-volatile memory when executing access commands. When there is a need to enhance the performance of a particular submission queue within a specific endurance group, the conventional SR-IOV architecture cannot adjust relevant settings for that submission queue to improve the performance during the execution of access commands.

SUMMARY OF THE PRESENT DISCLOSURE

Accordingly, a solid-state storage device and a method for maintaining performance thereof are provided in the present disclosure to address the aforementioned issues.

In an aspect of the present disclosure, a solid-state storage device is provided, which is electrically connected to a host. The solid-state storage device includes a controller, a volatile memory, and a non-volatile memory. The volatile memory is electrically connected to the controller. The non-volatile memory is electrically connected to the controller. The controller is configured to divide the non-volatile memory into a plurality of functional regions. The controller is configured to set a functional-region weight value corresponding to a priority of each functional region, and use a weighted round robin mechanism to perform a number of access commands for each functional region according to the functional-region weight value of each functional region. The controller is configured to set a submission-queue weight value corresponding to each submission queue within each functional region. In response to a specific submission queue within a specific functional region among the plurality of functional regions being lower than a performance threshold, the controller is further configured to increase the submission-queue weight value corresponding to the specific submission queue to maintain the specific submission queue at a predetermined performance.

In another aspect of the present disclosure, a method for maintaining performance of a solid-state storage device is provided. The solid-state storage device is electrically connected to a host, and includes a controller, a volatile memory, and a non-volatile memory. The method includes the following steps: utilizing the controller to divide the non-volatile memory into a plurality of functional regions; utilizing the controller to set a functional-region weight value corresponding to a priority of each functional region, and to use a weighted round robin mechanism to perform a number of access commands for each functional region according to the functional-region weight value of each functional region; utilizing the controller to set a submission-queue weight value corresponding to each submission queue within each functional region; and in response to a specific submission queue within a specific functional region among the plurality of functional regions being lower than a performance threshold, utilizing the controller to increase the submission-queue weight value corresponding to the specific submission queue to maintain the specific submission queue at a predetermined performance.

BRIEF DESCRIPTION OF THE DRAWINGS

Aspects of the present disclosure are best understood from the following detailed description when read with the accompanying figures. It is noted that in accordance with the standard practice in the industry, various features are not drawn to scale. In fact, the dimensions of the various features may be arbitrarily increased or reduced for clarity of discussion.

DETAILED DESCRIPTION

The following description is for the purpose for describing preferred embodiments of the present disclosure, with the aim of describing the basic spirit of the present disclosure, but not to limit the present invention. The actual content of the invention should be referred to the appended claims.

It should be understood that the words "comprising" and "including" used in this specification are used to indicate the existence of specific technical features, numerical values, method steps, work processes, elements and/or components, but not to exclude additional technical features, numerical values, method steps, operations, elements, components, or any combination thereof.

The use of words such as "first," "second," and "third" in the scope of the patent application are used to modify the elements in the scope of the patent application, and are not used to indicate the priority order or precedence relationship between them, one component preceding another component, or the time sequence in which method steps are executed, and are only used to distinguish components with the same name.

The term "configured to" may describe or claim that various units, circuits, or other components are "configured to" perform a task or tasks. In such contexts, the term "configured to" implies that the units/circuits/components include a structure (e.g., circuitry) that performs their task(s) during operation. Thus, a specified unit/circuit/component may be said to be configured to perform the task even when the unit/circuit/component is not currently operating (e.g., not turned on). Such units/circuits/components accompanied by the term "configured to" include hardware—for example: circuits, memory (which stores program commands that are executable to perform operations), etc. Additionally, "configured to" may include a generic structure (e.g., general circuitry) that is manipulated by software and/or firmware (e.g., an FPGA or a general-purpose processor executing the software) to operate in a manner that enables the execution of the task(s) to be solved. Further, "configured to" may include adapting a manufacturing process (e.g., a semiconductor manufacturing equipment) to produce a device (e.g., an integrated circuit) adapted to perform one or more tasks.

Figure 1:
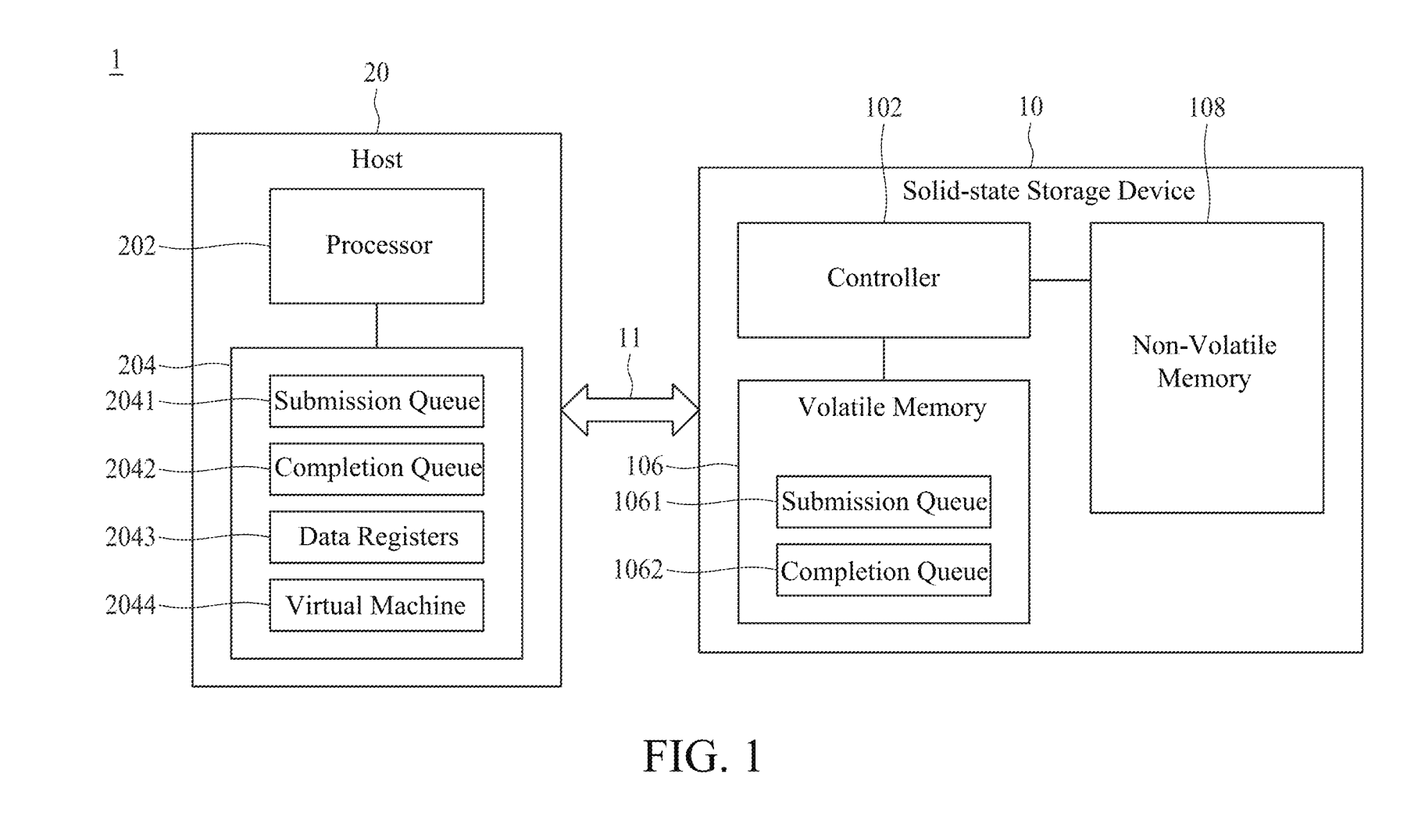
FIG. 1 is a block diagram of a computer system in accordance with an embodiment of the present disclosure.

FIG. 1 is a block diagram of a computer system in accordance with an embodiment of the present disclosure.

As shown in FIG. 1, the computer system 1 may include a solid-state storage device 10 and a host 20. The solid-state storage device 10 may be electrically connected to the host 20 through a bus 11 for command and data transmission. In some embodiments, the bus 11 may be a Universal Serial Bus (USB), a Serial Advanced Technology Attachment (SATA) bus, or a Peripheral Component Interconnect Express (PCI Express, PCIe) bus, etc., but the present disclosure is not limited thereto.

The solid-state storage device 10 may include a controller 102, a volatile memory 106 and a non-volatile memory 108. The controller 102 may be electrically connected to the volatile memory 106 and the non-volatile memory 108, and used to control data access of the volatile memory 106 and the non-volatile memory 108. In some embodiments, the controller 102 may be, for example, a general-purpose processor, a microcontroller, an application-specific integrated circuit (ASIC), or a field programmable gate array (FPGA), etc., but the present disclosure is not limited thereto.

The volatile memory 106 may include, for example, a dynamic random access memory (DRAM) and/or a static random access memory (SRAM), but the present disclosure is not limited thereto. In some embodiments, the volatile memory 106 may be disposed external to the controller 102. In some other embodiments, the volatile memory 106 may be integrated into the controller 102. The non-volatile memory 108 may be, for example, a NAND flash memory for storing write data provided by the host 20.

The host 20 may include, for example, a processor 202 and a system memory 204, and the processor 202 is electrically connected to the system memory 204. In some embodiments, the processor 202 may include, for example, a central processing unit, a general-purpose processor, a microprocessor, etc., but the present disclosure is not limited thereto. In addition, the processor 202 may include a controller (not shown) controlling data access to the system memory 204. The system memory 204 may include, for example, a DRAM, but the present disclosure is not limited thereto.

In some embodiments, the host 20 can support the Non-Volatile Memory Express (NVM Express, NVMe) protocol, and the system memory 204 may be equipped with a submission queue 2041, a completion queue 2042, data registers 2043, and a virtual machine 2044. The submission queue 2041 may be configured to record access commands issued by the processor 202, and the completion queue 2042 may be configured to record the status of the completed access commands of the solid-state storage device 10. The data registers 2043 may be configured to store data to be written to the solid-state storage device 10 by the host 20 and to store data read from the solid-state storage device 10 by the host 20.

Figure 2A:
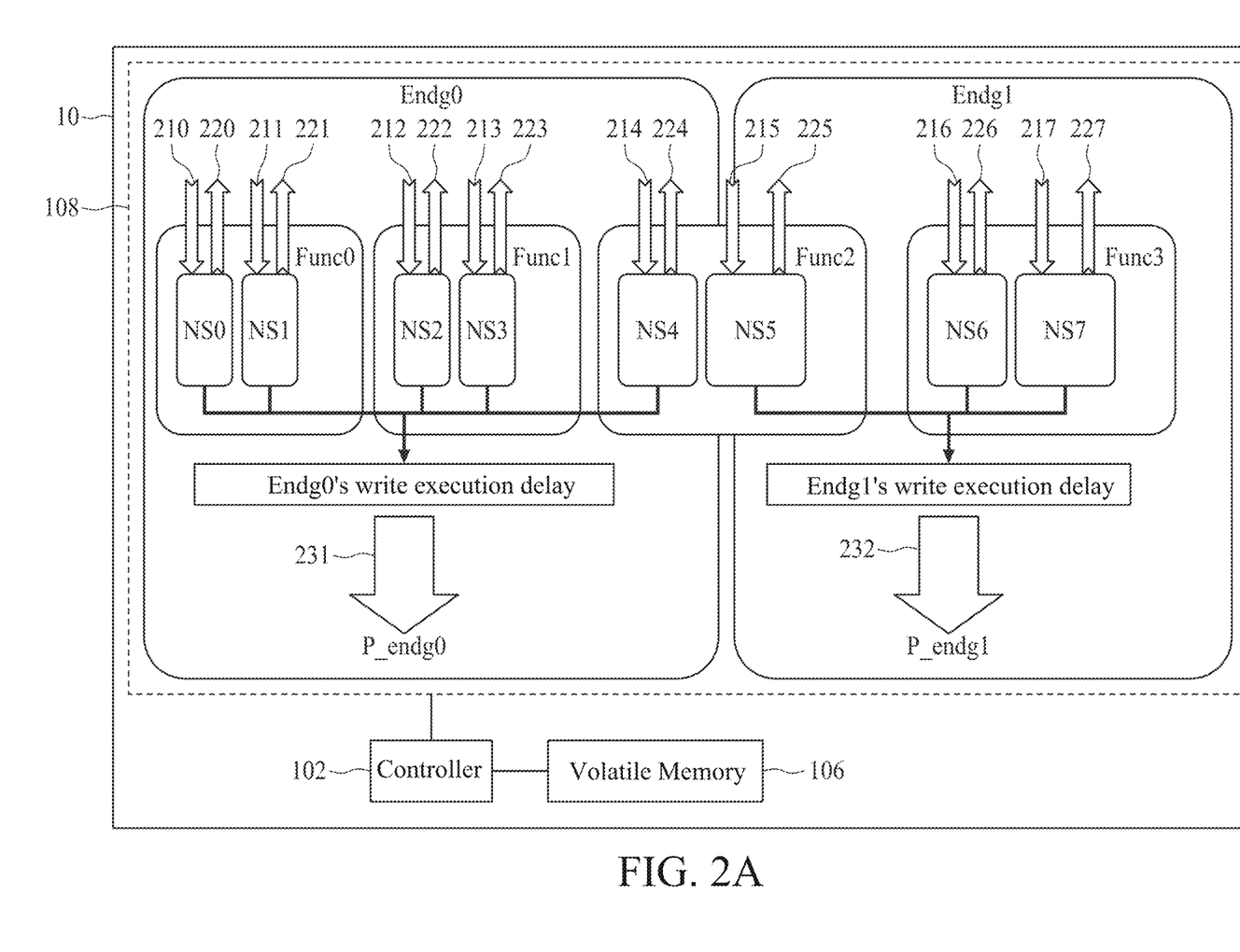
FIG. 2A is a diagram of a single-root input/output virtualization architecture of a solid-state storage device in accordance with an embodiment of the present disclosure.
Figure 2B:
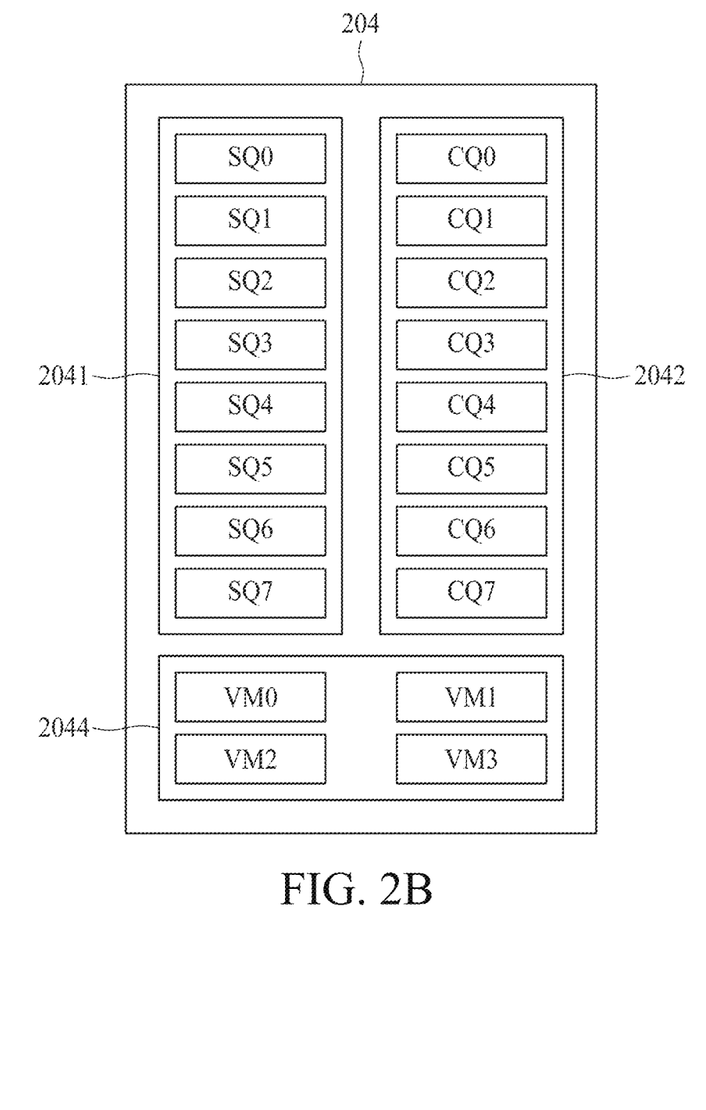
FIG. 2B is a diagram of the submission queue, completion queue and virtual machines within the host in accordance with the embodiment of FIG. 2A of the present disclosure.

The virtual machine 2044 includes, for example, one or more virtual machines (e.g., virtual machines VM0 to VM3, as shown in FIG. 2B), each of which can be considered as a computer within the computer and can execute applications and programs, and is almost isolated from other virtual machines running on the same host. Specifically, in the field of computer science, a virtual machine refers to a special software that can create an environment between a computer platform and end users, and end users operate other software based on the environment created by the virtual machine software. A virtual machine is a simulator of a computer system, which can provide the functions of a physical computer by simulating a complete hardware system running in a fully isolated environment through software.

In some embodiments, the solid-state storage device 10 may support the NVMe standard, and the controller 102 may retrieve access commands from the submission queue 2041 of the host 20, such as write commands, read commands, etc. The volatile memory 106 may be equipped with a submission queue 1061 and a completion queue 1062. The submission queue 1061 may be used to record the access commands retrieved from the host 20, and the completion queue 1062 may be used to record the status of the access commands completed by the solid-state storage device 10.

The non-volatile memory 108 may include a plurality of blocks, and each block may include a plurality of pages. For example, the non-volatile memory 108 can include 1024 blocks, and each block can include 64 pages, with the capacity of each page being 16 KB and each block being 1 MB. The aforementioned data is for the purpose of description, and the manufacturer of the non-volatile memory 108 can determine the number of pages in each block and the capacity of each page.

Figure 2C:
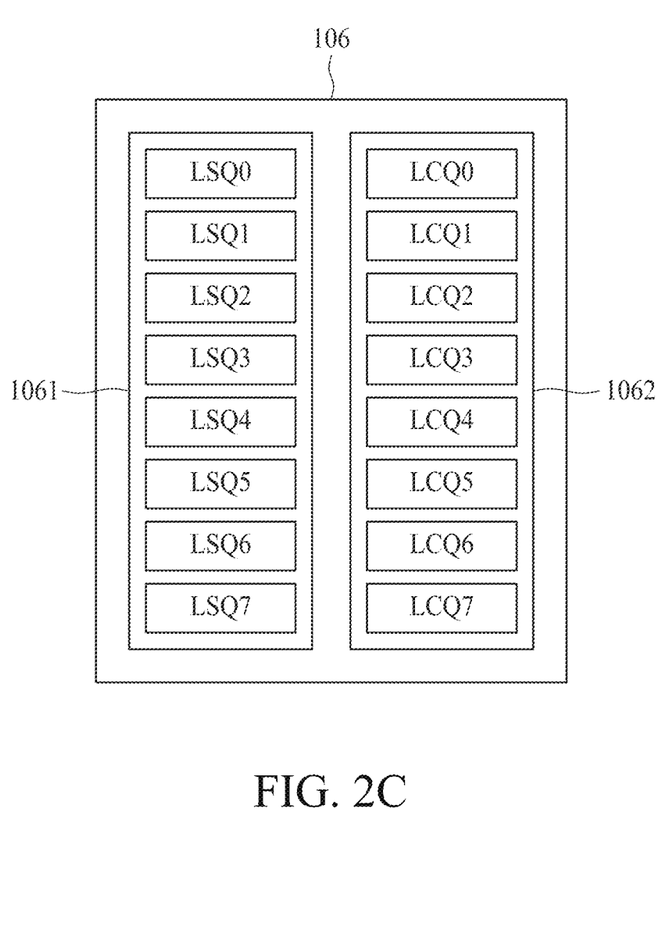
FIG. 2C is a diagram of a submission queue and a completion queue in the solid-state storage device in accordance with the embodiment of FIG. 2A of the present disclosure.

FIG. 2A is a diagram of a single-root input/output virtualization architecture of a solid-state storage device in accordance with an embodiment of the present disclosure. FIG. 2B is a diagram of the submission queue, completion queue and virtual machines within the host in accordance with the embodiment of FIG. 2A of the present disclosure. FIG. 2C is a diagram of a submission queue and a completion queue in the solid-state storage device in accordance with the embodiment of FIG. 2A of the present disclosure.

In some embodiments, the single-root I/O virtualization (SR-IOV) architecture of the non-volatile memory 108, as shown in FIG. 2A, includes endurance groups Endg0 and Endg1. Single-root I/O virtualization means that a physical PCIe device (e.g., solid-state storage device 10) can be simulated as multiple accessible PCIe devices through virtualization. It should be noted that persons of ordinary skill in the art would understand that the endurance groups in the non-volatile memory 108 are not limited to two, and the non-volatile memory 108 may have one or more than two endurance groups.

As shown in FIG. 2A, the non-volatile memory 108 includes multiple functional regions Func0, Func1, Func2, and Func3. Func0 and Func1 belong to endurance group Endg0, Func3 belongs to endurance group Endg1, and Func2 spans endurance groups Endg0 and Endg1. In some embodiments, each of the functional regions Func0 to Func3 may be considered as a physical function or a virtual function, and correspond to the virtual machines VM0 to VM3 (or applications) executed on the host 20. That is, each of the virtual machines VM0 to VM3 can control the data access of the corresponding physical functional regions and virtual functional regions within the solid-state storage device 10 through the various physical PCIe ports on the solid-state storage device 10.

In some embodiments, NAND memory cells within the non-volatile memory 108 may include single-level cells (SLCs) and triple-level cells (TLCs). The SLCs are classified into endurance group Endg0, while the TLCs are classified into endurance group Endg1. In other embodiments, the non-volatile memory 108 includes multiple non-volatile memory sets (NVM sets), and each NVM set may include one or more namespaces, where each functional region Func0 to Func3 may have a corresponding NVM set.

As shown in FIG. 2A, functional region Func0 includes namespaces NS0 and NS1, functional region Func1 includes namespaces NS2 and NS3, functional region Func2 includes namespaces NS4 and NS5, and functional region Func3 includes namespaces NS6 and NS7. For the host 20, each of the namespaces NS0 to NS7 may be regarded as a physical disk area, meaning that namespaces NS0 to NS7 partition the non-volatile memory 108 into individually addressable logical storage spaces. In some embodiments, each of the namespaces NS0 to NS7 has an individual namespace ID. In other embodiments, some of the namespaces NS0 to NS7 share the same namespace ID.

Furthermore, as shown in FIG. 2B, each of the namespaces NS0 to NS7 has an individual submission queue 2041 (e.g., SQ0 to SQ7) and an individual completion queue 2042 (e.g., CQ0 to CQ7) in the system memory 204 of the host 20. As shown in FIG. 2C, each of the namespaces NS0 to NS7 also has an individual submission queue 1061 (e.g., LSQ0 to LSQ7) and an individual completion queue 1062 (e.g., LCQ0 to LCQ7) within the volatile memory 106 of the solid-state storage device 10. Specifically, as shown in FIG. 2B, the submission queue 2041 of the host 20 includes submission queues SQ0 to SQ7, and the completion queue 2042 includes completion queues CQ0 to CQ7. In addition, the submission queue 1061 of the solid-state storage device 10 includes submission queues LSQ0 to LSQ7, and the completion queue 1062 includes completion queues LCQ0 to LCQ7. In an embodiment, submission queues LSQ0 to LSQ7 correspond to submission queues SQ0 to SQ7, and completion queues LCQ0 to LCQ7 correspond to completion queues CQ0 to CQ7.

For example, when the controller 102 fetches access commands corresponding to namespace NS0 from the submission queue SQ0 of the host 20, the controller 102 stores the fetched access commands of namespace NS0 in the submission queue LSQ0, wherein the access commands may include information about the endurance group number, functional region number, namespace number, etc., but the present disclosure is not limited thereto. When a specific access command in the submission queue LSQ0 has been executed by the controller 102, the controller 102 writes the completion information corresponding to the specific access command to the completion queue LCQ0, and deletes that specific access command from the submission queue LSQ0. Then, the controller 102 writes the completion information corresponding to the specific access command to the completion queue CQ0 of the host 20, and deletes that specific access command from the submission queue SQ0 of the host 20. The operations related to the fetching and execution of access commands corresponding to other namespaces NS1 to NS7 by the controller 102 can be derived in a similar manner, so the details thereof are not repeated here. In another embodiment, the submission queues LSQ0 to LSQ7 are not one-to-one corresponding to the submission queues SQ0 to SQ7, and the completion queues LCQ0 to LCQ7 are also not one-to-one corresponding to the completion queues CQ0 to CQ7. The use order of the submission queues LSQ0 to LSQ7 and the completion queues LCQ0 to LCQ7 depends on the time when the controller 102 retrieves, executes, and completes the access commands.

As shown in FIG. 2A, the namespace NS0 has transmission paths 210 and 220, meaning that the controller 102 fetches and executes the access command in the submission queue SQ0 of the host 20 through the transmission path 210, stores the same in the submission queue LSQ0 of the volatile memory 106, and writes the completion information of the executed access command in the submission queue LSQ0 to the completion queue CQ0 of the host 20 through the transmission path 220. In addition, when executing the access commands of the namespace NS0 in the submission queue LSQ0 (e.g., write commands or read commands), the controller 102 can control the data access of the namespace NS0 through the transmission paths 210 and 220, for example, obtaining the write data of the write commands from the data registers 2043 of the host 20, or executing read commands to read the corresponding data from the namespace NS0 and write the same to the data registers 2043 of the host 20.

In some embodiments, the endurance group Endg0 includes namespaces NS0 to NS4, and the write execution delay of the endurance group Endg0 considers the overall write execution delay of namespaces NS0 to NS4, where the write execution delay represents the time interval between the controller 102 storing the access commands extracted from the host 20 in the corresponding submission queues LSQ0 to LSQ4 and actually executing the stored access commands in the submission queues LSQ0 to LSQ4. For example, when the controller 102 actually executes the access commands of the functional regions Func0 to Func2 in the endurance group Endg0, the controller 102 can calculate the bandwidth of the data stream 231 when executing the relevant access commands of the endurance group Endg0 to obtain the performance P_endg0 of the endurance group Endg0 (e.g., write performance). Similarly, the endurance group Endg1 includes namespaces NS5 to NS7, and the write execution delay of the endurance group Endg1 considers the overall write execution delay of namespaces NS5 to NS7. In addition, when the controller 102 actually executes the access commands of the functional regions Func2 to Func3 in the endurance group Endg1, the controller 102 can calculate the bandwidth of the data stream 232 when executing the relevant access commands of the endurance group Endg1 to obtain the performance P_endg1 of the endurance group Endg1 (e.g., write performance).

Figure 3:
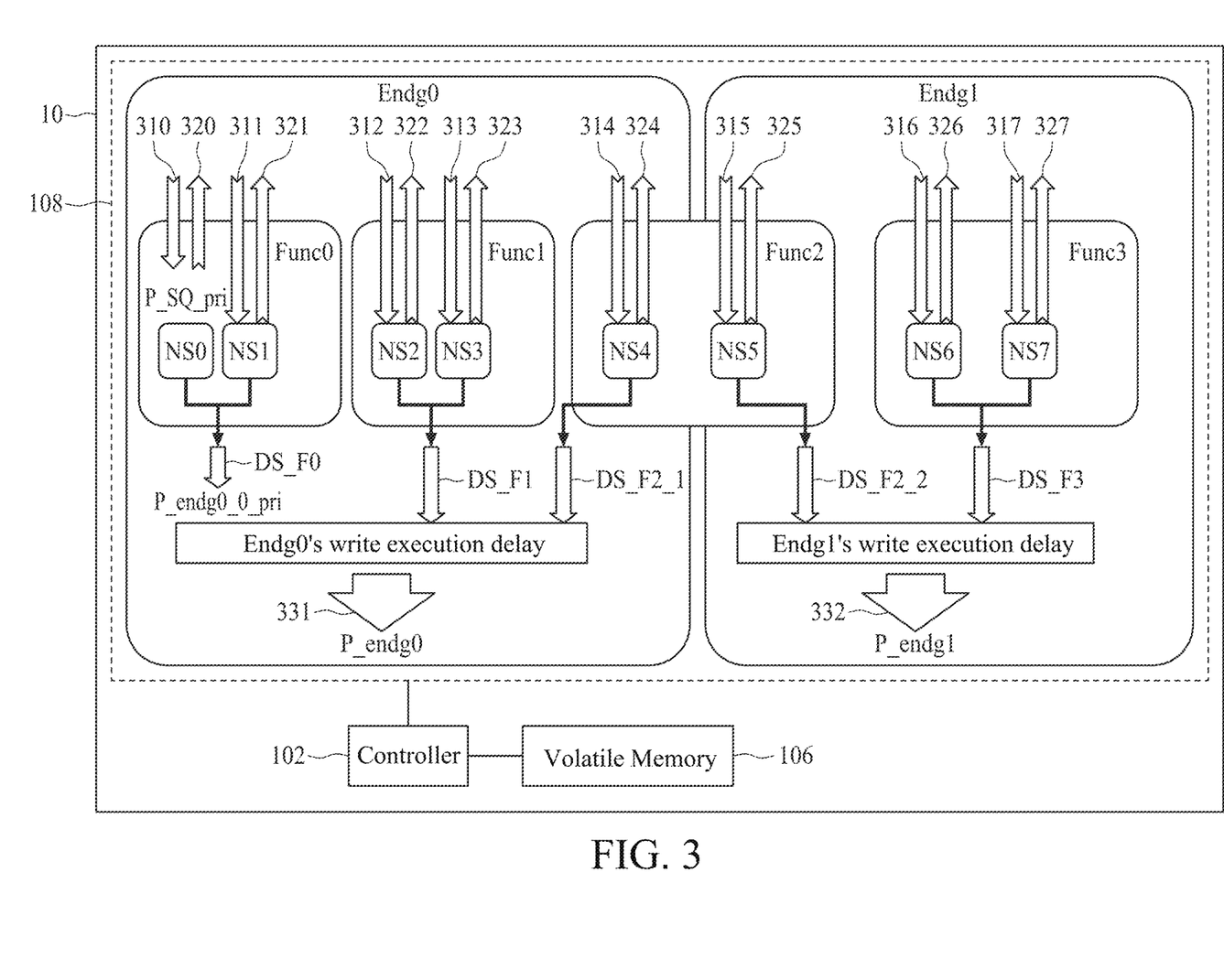
FIG. 3 is a diagram of a single-root input/output virtualization architecture for a solid-state storage device in accordance with another embodiment of the present disclosure.

FIG. 3 is a diagram of a single-root input/output virtualization architecture for a solid-state storage device in accordance with another embodiment of the present disclosure.

Figure 4A:
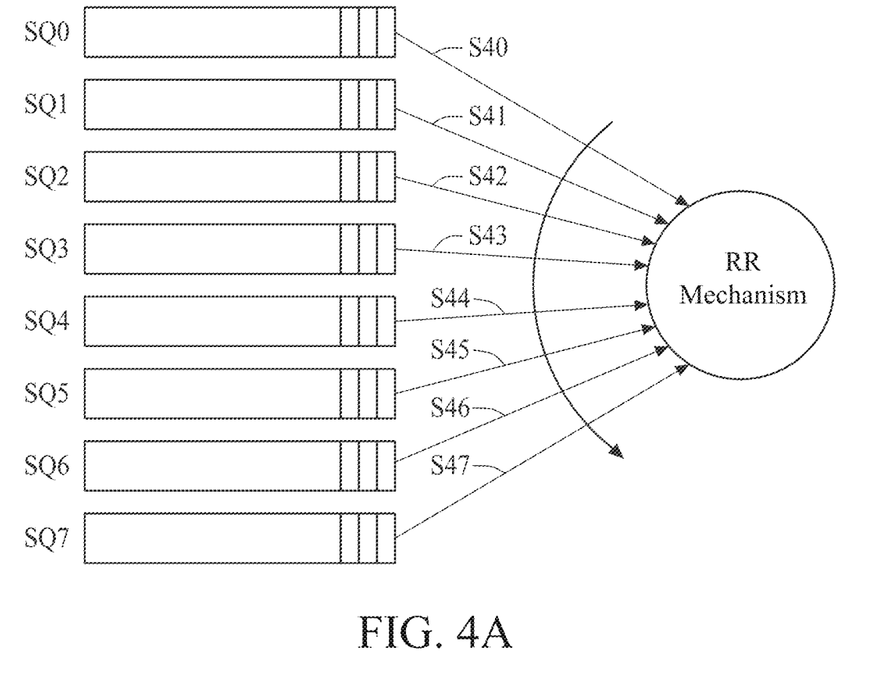
FIG. 4A is a diagram illustrating a command fetch mechanism defined by the NVMe standard in accordance with an embodiment of the present disclosure.
Figure 4B:
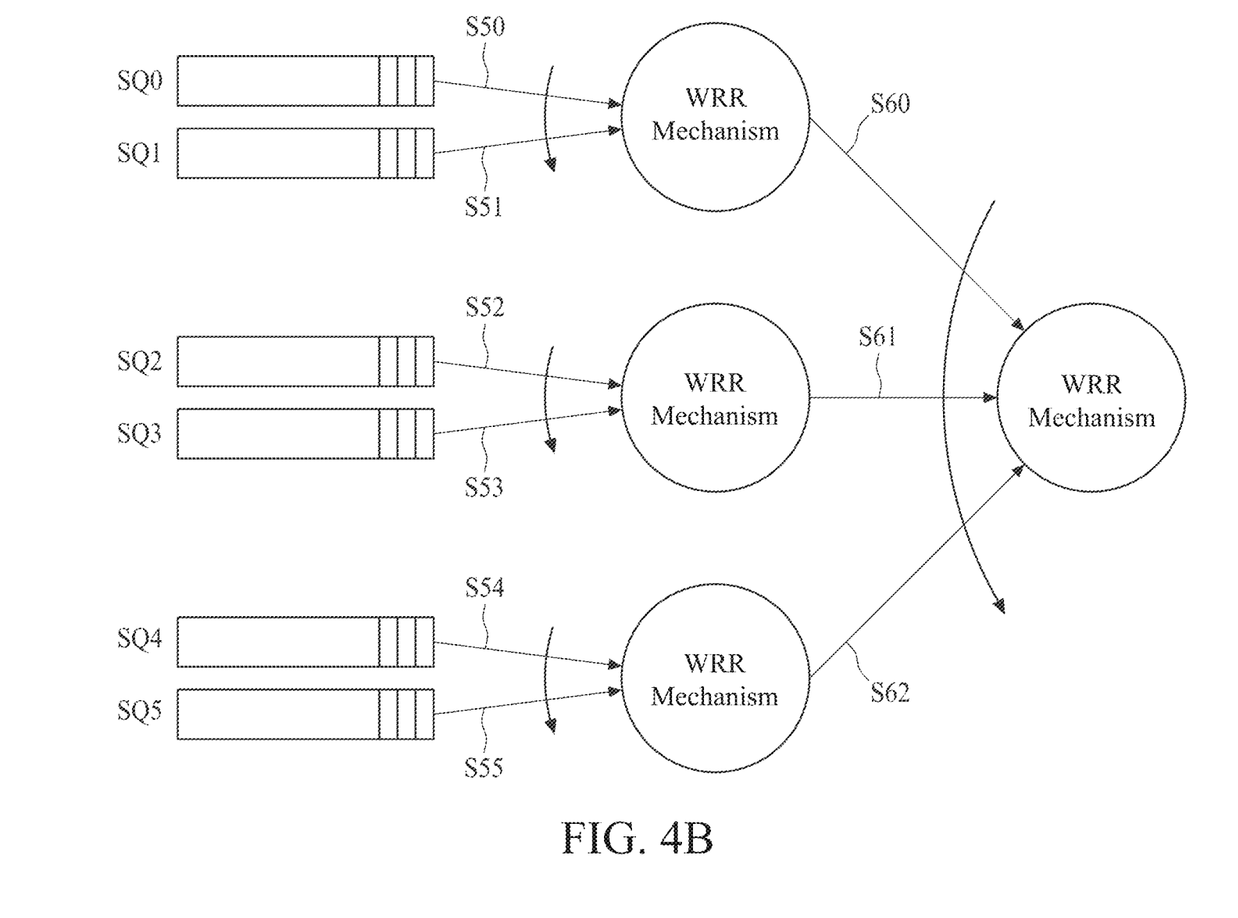
FIG. 4B is a diagram illustrating a command fetch mechanism defined by the NVMe standard in accordance with another embodiment of the present disclosure.

FIG. 4A is a diagram illustrating a command fetch mechanism defined by the NVMe standard in accordance with an embodiment of the present disclosure. FIG. 4B is a diagram illustrating a command fetch mechanism defined by the NVMe standard in accordance with another embodiment of the present disclosure. Please refer to both FIG. 3 and FIGS. 4A-4B.

The SR-IOV architecture in FIG. 3 is similar to that in FIG. 2A, with the difference being that, in the SR-IOV architecture of FIG. 3, the controller 102 can calculate the performance of each functional region Func0 to Func3 and calculate the performance of each submission queue corresponding to each namespace in each functional region Func0 to Func3. For example, the submission queues SQ0 and SQL correspond to namespaces NS0 and NS1 in functional region Func0, respectively. The submission queues SQ2 and SQ3 correspond to namespaces NS2 and NS3 in functional region Func1, respectively. The submission queues SQ4 and SQ5 correspond to namespaces NS4 and NS5 in functional region Func2, respectively. The submission queues SQ6 and SQ7 correspond to namespaces NS6 and NS7 in functional region Func3, respectively. In addition, the controller 102 can set the priority of each functional region Func0 to Func3, such as a high priority (H), a medium priority (M), or a low priority (L), and set the corresponding functional-region weight value for each functional region Func0 to Func3. The controller 102 can also set the submission-queue weight values of submission queues corresponding to each namespace in each functional region Func0 to Func3.

For example, the specification of the NVMe standard defines two command fetch mechanisms, such as the Round Robin (RR) mechanism and the Weighted Round Robin (WRR) mechanism; the RR mechanism is illustrated in FIG. 4A, and the WRR mechanism is illustrated in FIG. 4B. For purposes of description, FIG. 4A illustrates how the solid-state storage device 10 fetches commands from submission queues SQ0 to SQ7 via the RR mechanism, which can be applicable to the SR-IOV architecture shown in FIG. 2A. However, persons of ordinary skill in the art would understand that the submission queue 2041 of the host 20 may include different numbers of submission queues. Specifically, when all submission queues SQ0 to SQ7 of the host 20 have stored access commands, the controller 102 of the solid-state storage device 10 can receive notifications from the host 20 (e.g., based on respective doorbell registers corresponding to submission queues SQ0 to SQ7), fetch access commands from submission queues SQ0 to SQ7, and store the fetched access commands in the submission queues LSQ0 to LSQ7, respectively. When the controller 102 performs the RR mechanism on the access commands stored in the submission queues SQ0 to SQ7 (corresponding to the submission queues LSQ0 to LSQ7), the controller 102 sequentially performs operations S40 to S47 to fetch a predetermined number of access commands from the submission queues SQ0 to SQ7, and stores the fetched access commands in the submission queues LSQ0 to LSQ7, respectively. The controller 102 then executes a predetermined number of access commands (e.g., 10 access commands) in the submission queues LSQ0 to LSQ7.

It should be noted that, in the RR mechanism of FIG. 4A, the controller 102 does not consider the functional-region weight values of each functional region Func0 to Func3, and each submission queue SQ0 to SQ7 (corresponding to the submission queues LSQ0 to LSQ7) has the same submission-queue weight value (e.g., 10), i.e., the same number of access commands. The controller 102 can repeat operations S40 to S47 according to the submission-queue weight values for the submission queues SQ0 to SQ7 (corresponding to the submission queues LSQ0 to LSQ7).

For purposes of description, in the embodiments described later, the operation in which the controller 102 fetches and executes a predetermined number (corresponding to the submission-queue weight value of the submission queue SQ0) of access commands from the submission queue SQ0 can indicate that the controller 102 fetches a predetermined number of access commands from submission queue SQ0, and writes the fetched access commands to the submission queue LSQ0 of the solid-state storage device 10, and then executes the predetermined number of access commands in the submission queue LSQ0. Similar operations for fetching and executing a predetermined number of access commands from other submission queues SQ1 to SQ7 can be derived in a similar manner.

FIG. 4B illustrates that the solid-state storage device 10 can perform the WRR mechanism for functional regions with different priorities, and perform the WRR mechanism for submission queues with different priorities within each functional region. For the purpose of illustration, functional region Func0 has a high priority (H), functional region Func1 has a medium priority (M), and functional region Func2 has a low priority (L). In addition, each of functional regions Func0, Func1, and Func2 has a corresponding functional-region weight value, Func_WEI_H, Func_WEI_M, and Func_WEI_L, respectively. Specifically, the controller 102 fetches and executes access commands for each functional region Func0, Func1, and Func2 from submission queues SQ0 to SQ5 based on the functional-region weight values Func_WEI_H, Func_WEI_M, and Func_WEI_L corresponding to functional regions Func0, Func1, and Func2.

Assuming that the functional-region weight values Func_WEI_H, Func_WEI_M, and Func_WEI_L corresponding to functional regions Func0, Func1, and Func2 are 250, 150, and 100, respectively. Under the WRR mechanism, the controller 102 may prioritize the execution of 250 access commands for functional region Func0 (operation S60), followed by the execution of 150 access commands for functional region Func1 (operation S61), and then the execution of 100 access commands for functional region Func2 (operation S62). Furthermore, the namespaces NS0 and NS1 in functional region Func0 have corresponding submission queues SQ0 and SQ1 with high and medium priorities, and the submission-queue weight values corresponding to the submission queues SQ0 and SQL are 150 and 100, respectively. When the controller 102 executes the 250 access commands for functional region Func0, under the WRR mechanism, the controller 102 will first fetch and execute 150 access commands from submission queue SQ0 (operation S50), and then fetch and execute 100 access commands from submission queue SQ1 (operation S51).

The WRR mechanism in FIG. 4B can be divided into steps 1 to 7. First, the controller 102 performs operation S60 to select functional region Func0 with a high priority based on the WRR mechanism (step 1), and fetches and executes a total of 250 access commands from the corresponding submission queues SQ0 and SQL of Func0, or until both submission queues SQ0 and SQ1 have no access commands (step 2). Next, the controller 102 performs operation S61 to select functional region Func1 with a medium priority based on the WRR mechanism (step 3), and fetches and executes a total of 150 access commands from the corresponding submission queues SQ2 and SQ3 of functional region Func1, or until both submission queues SQ2 and SQ3 have no access commands (step 4). Finally, the controller 102 performs operation S62 to select functional region Func2 with a low priority based on the WRR mechanism (step 5), and fetches and executes a total of 100 access commands from the corresponding submission queues SQ4 and SQ5 of Func2, or until both submission queues SQ4 and SQ5 have no access commands (step 6). In step 7, the controller 102 repeats the aforementioned steps 1 to 6.

When the controller 102 repeats the above steps 1-6, the controller 102 can simultaneously calculate the performance P_endgN_F_pri of the functional regions in the endurance group N with a high priority, a medium priority, and a low priority; for example, it can be represented by equation (1) as follows.

$$P\_endgN\_F\_pri = \frac{1}{Func\_num\_pri} \times \frac{Func\_WEI\_pri}{Func\_totalWEI} \times P\_endgN \quad (1)$$

For example, if functional region Func0 within the endurance group 0 has high priority (H), P_endgN_F_pri can be represented by P_endg0_0_H. Func_num_pri represents the number of functional regions with a certain priority. If functional regions Func1 and Func2 have medium priorities, then Func_num_M=2, and so on. Func_WEIL_pri represents the functional-region weight value corresponding to the priority of each functional region. If functional region Func0 has high priority and its functional-region weight value is 250, Func_WEI_pri can be represented by Func_WEI_H=250, and so on. Func_totalWEI represents the total weight value of the functional regions with a high priority, a medium priority, and a low priority. If the functional weight values Func_WEI_H, Func_WEI_M, and Func_WEI_L for high priority, medium priority, and low priority functional regions are 250, 150, and 100, respectively, the total functional weight value Func_totalWEI is equal to 250+150+100=500. P_endgN represents the performance corresponding to endurance group N, which can be obtained by aggregating the performance of the respective submission queues in endurance group N.

In some embodiments, in addition to using the WRR mechanism between functional regions with different priorities, the controller 102 can also use the WRR mechanism for each submission queue within each functional region with a certain priority. The performance P_SQ_pri of each submission queue within a functional region with a specific priority can be expressed by equation (2) as follows.

$$P\_SQ\_pri = \frac{1}{SQ\_num\_pri} \times \frac{SQ\_WEI\_pri}{SQ\_totalWEI} \times P\_endgN\_F\_pri \quad (2)$$

where SQ_num_pri represents the number of submission queues with a certain priority. For purposes of description, the submission queues LSQ0 and LSQ1 corresponding to functional region Func0 are used as examples. If the submission queue LSQ0 has a high priority and the submission queue LSQ1 has a medium priority, then SQ_num_H=1 and SQ_num_M=1, and so on. SQ_WEL_pri represents the submission-queue weight values corresponding to the priority of each submission queue. For example, if the submission queue SQ0 has a high priority and submission queue SQ1 has a medium priority, they may have the corresponding submission-queue weight values of 150 and 100, such as SQ_WEI_H=150 and SQ_WEI_M=100, and so on. SQ_totalWEI represents the total sum of submission-queue weight values corresponding to the submission queues having high, medium, and low priorities. For example, if SQ_WEI_H=150 and SQ_WEI_M=100, then SQ_total-WEI=150+100=250. P_endgN_F_pri represents the performance of a specific functional region with a high, medium, or low priority within endurance group N. For example, when the controller 102 is executing access commands for functional regions Func0 to Func3, the controller 102 can calculate the data bandwidth corresponding to data streams DS_F0, DS_F1, (DS_F2_1+DS_F2_2), and DS_F3 corresponding to each functional region Func0 to Func3 to obtain the performance corresponding to each functional region Func0 to Func3.

In some embodiments, assuming that functional region Func0 has a high priority and the namespaces NS0 and NS1 within functional region Func0 correspond to submission queues SQ0 and SQ1, the controller 102 can also set the corresponding priorities for submission queues SQ0 and SQL, such as a high, medium, or low priority. For purposes of description, the submission queues SQ0 and SQ1 within functional region Func0 with a high priority have high and medium priorities, respectively, indicating that the submission queue SQ0 is the submission queue with a high priority within functional region Func0 with a high priority.

In some embodiments, for example, when the controller 102 is executing access commands for the submission queues SQ0 and SQL corresponding to functional region Func0, the controller 102 can also calculate the data bandwidth on transmission paths 310 and 311 to obtain the performances of the submission queues SQ0 and SQL, such as the performance P_SQ_pri shown in FIG. 3.

In some embodiments, certain applications (or virtual machines) executed by the host 20 have extremely high write or read time requirements, such as real-time video streaming applications, automatic driving systems, automatic braking systems, etc. When it is necessary to write one or more scene images captured by image sensors to the solid-state storage device 10 in real time, the solid-state storage device 10 needs to ensure that the data is programmed into the non-volatile memory 108 within the specified write time requirements of the applications, and the controller 102 can set the corresponding functional regions of the applications to have high priority. In addition, certain applications (or virtual machines) executed by the host 20 do not have particularly strict write or read time requirements, such as multimedia playback programs, so the controller 120 can set the corresponding functional regions of the applications to have low priority. If certain applications (or virtual machines) executed by the host 20 have general write or read time requirements, the controller 102 can set the corresponding functional regions of the applications to have a medium priority. Persons of ordinary skill in the art in this field would appreciate that the types of applications mentioned above are for purposes of description, and the present disclosure is not limited thereto.

In some embodiments, the controller 102 can set a performance threshold for the high-priority submission queue (e.g., submission queue SQ0/LSQ0 corresponding to functional region Func0) corresponding to the high-priority functional region. When the performance of the submission queue calculated by the controller 102 is below the performance threshold, the controller 102 increases the submission-queue weight value corresponding to the submission queue to maintain the submission queue at a predetermined performance (e.g., represented by available predetermined bandwidth in bytes per second). For example, functional region Func0 is a high-priority functional region with a functional-region weight value of 250, and submission queues SQ0 and SQL have high and medium priorities with corresponding submission-queue weight values of 150 and 100, respectively. If the application executed by the host 20 corresponding to functional region Func0 has very high write or read time requirements, the submission-queue weight value for the submission queue SQ0 needs to be set at 130 or higher to maintain the performance of the submission queue SQ0 to meet the required write or read time of the application. However, in the case of a large amount of access load on the solid-state storage device 10, when the controller 102 is executing the WRR mechanism, a performance loss of the submission queue SQ0 may be caused by a delay due to the large amount of access load, for example, reducing the original performance of submission queue SQ0 (e.g., 100 MB/s) to a predetermined proportion (e.g., 90%) or less. At this time, the controller 102 can adjust the submission-queue weight value for the submission queue SQ0 (e.g., increase to 165) to maintain the performance of SQ0 at the predetermined performance (i.e., to maintain the data bandwidth when executing the access commands for submission queue SQ0) to meet the required write or read time of the application.

In the architecture of FIG. 2A, the controller 102 can only calculate the performance of each endurance group separately. Depending on the virtual machine running on the host 20, if a specific submission queue in a specific functional region in a specific endurance group is highly important for a specific virtual machine running on the host 20 (e.g., has very strict write or read time requirements) or has a higher performance requirement for a specific submission queue, the controller 102 in the architecture of FIG. 2A cannot independently set the functional-region weight values for each functional region Func0 to Func3, let alone independently set the submission-queue weight values for each namespace in each functional region Func0 to Func3, and therefore cannot adjust the performance of any submission queue in each functional region Func0 to Func3.

In the architecture of FIG. 3, the controller 102 can not only calculate the performance of each endurance group, but also the performance of each functional region in each endurance group, and can also calculate the performance of each submission queue in each functional region. In addition, the controller 102 can independently set the functional-region weight value corresponding to each functional region Func0 to Func3, and independently set the submission-queue weight values for the submission queue corresponding to each namespace in each functional region Func0 to Func3, so the controller 102 can adjust the performance of any submission queue in each functional region Func0 to Func3. In other words, when there is a demand for the performance of a specific submission queue in a specific functional region, the controller 102 can adjust the submission-queue weight value for that specific submission queue to improve its performance, or maintain that specific submission queue at the predetermined performance.

Figure 5:
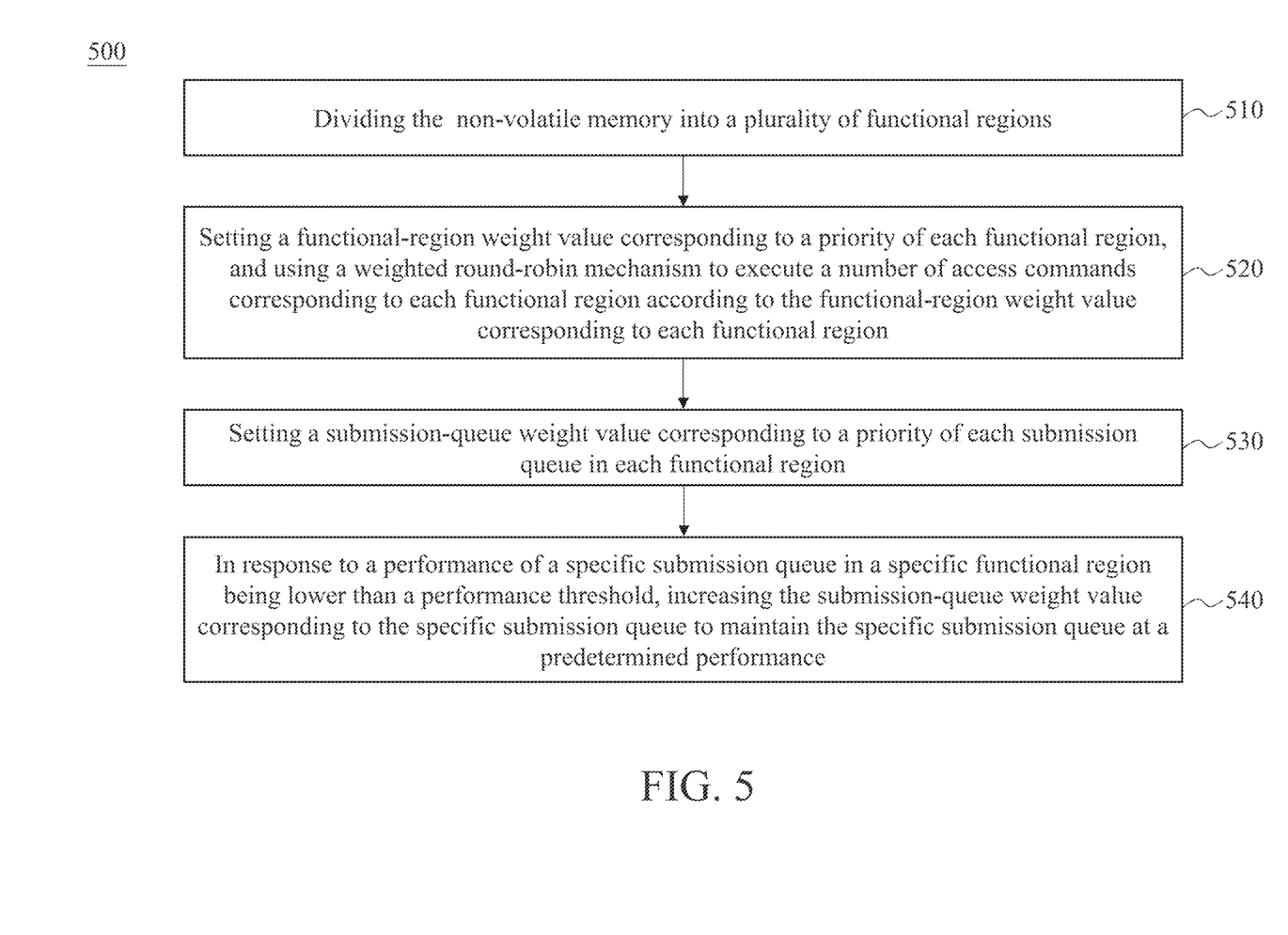
FIG. 5 is a flowchart of a method for maintaining performance of a solid-state storage device in accordance with an embodiment of the present disclosure.

FIG. 5 is a flowchart of a method for maintaining performance of a solid-state storage device in accordance with an embodiment of the present disclosure. Please refer to both FIG. 3 and FIG. 5.

In step 510, the controller 102 divides the non-volatile memory 108 into multiple functional regions. For example, the non-volatile memory 108 may include functional regions Func0 to Func3, each corresponding to virtual machines VM0 to VM3 executed by the host 20, where the virtual machines VM0 to VM3 control the data access of functional regions Func0 to Func3, respectively.

In step 520, the controller 102 sets a functional-region weight value corresponding to a priority of each functional region, and performs a weighted round robin mechanism to execute a number of access commands corresponding to each functional region based on a respective weight value of each functional region. For example, as shown in FIG. 4B, functional region Func0 has a high priority (H), functional region Func1 has a medium priority (M), and functional region Func2 has a low priority (L). Additionally, functional regions Func0, Func1, and Func2 have corresponding functional-region weight values Func_WEI_H, Func_WEI_M, and Func_WEI_L, respectively. The controller 102 fetches and executes the access commands for each functional region Func0, Func1, and Func2 from the respective submission queues LSQ0 to LSQ5 based on the functional-region weight values Func_WEI_H, Func_WEI_M, and Func_WEI_L corresponding to each functional region Func0, Func1, and Func2.

In step 530, the controller 102 sets a submission-queue weight value corresponding to a priority of each submission queue within each functional region. For example, in addition to performing the weighted round robin mechanism on functional regions with different priorities, the controller 102 can also perform a weighted round robin mechanism for each submission queue corresponding to each functional region with different priorities. That is, as shown in FIG. 4B, different submission queues (e.g., SQ0 and SQ1) within a specific functional region (e.g., Func0) can have different priorities and corresponding submission-queue weight values, and the controller 102 can perform the weighted round robin mechanism for that specific functional region based on the submission-queue weight values corresponding to each submission queue within the specific functional region, as shown in operations S50 and S51 in FIG. 4B.

In step 540, in response to a performance of a specific submission queue within a specific functional region being lower than a performance threshold, the controller 102 increases the submission-queue weight value corresponding to the specific submission queue to maintain the performance of the specific submission queue at a predetermined performance. For example, the controller 102 can set a performance threshold for a specific high-priority submission queue (e.g., submission queue SQ0 corresponding to functional region Func0) corresponding to a high-priority functional region. When the performance of the specific submission queue calculated by the controller 102 is lower than the performance threshold, the controller 102 increases the submission-queue weight value for the specific submission queue to maintain the specific submission queue at the predetermined performance (e.g., represented in available predetermined bandwidth in bytes per second).

Recitation of the present disclosure herein with preferred embodiments is not intended to limit the scope thereof. Persons of ordinary skill in the art could easily modify the same without departing from the intended spirit and scope thereof. Therefore, the actual scope of the present disclosure shall be determined by the claims appended hereto.

What is claimed is:

1. A solid-state storage device, configured to electrically connected to a host, the solid-state storage device comprising:

a controller;

a volatile memory, electrically connected to the controller; and     a non-volatile memory, electrically connected to the controller;

wherein the controller is configured to divide the non-volatile memory into a plurality of functional regions;

wherein the controller is configured to set a functional-region weight value corresponding to a priority of each functional region, and use a weighted round robin mechanism to perform a number of access commands for each functional region according to the functional-region weight value of each functional region;

wherein the controller is configured to set a submission-queue weight value corresponding to each submission queue within each functional region; and wherein in response to a specific submission queue within a specific functional region among the plurality of functional regions being lower than a performance threshold, the controller is further configured to increase the submission-queue weight value corresponding to the specific submission queue to maintain the specific submission queue at a predetermined performance.

2. The solid-state storage device of claim 1, wherein the specific functional region among the plurality of functional regions has a high priority, and the specific submission queue within the specific functional region has a high priority.

3. The solid-state storage device of claim 1, wherein data access of each functional region within the non-volatile memory is controlled by one of a plurality of virtual machines running on the host.

4. The solid-state storage device of claim 1, wherein the controller is configured to use a weighted round robin mechanism to perform a number of access commands corresponding to each submission queue within the specific functional region according to the submission-queue weight value corresponding to each submission queue within the specific functional region.

5. The solid-state storage device of claim 1, wherein the controller is further configured to calculate a data bandwidth while executing the access commands in each submission queue within each functional region to obtain a performance of each submission queue within each functional region.

6. The solid-state storage device of claim 5, wherein the controller is further configured to aggregate the performance of each submission queue within each functional region to derive a performance of each functional region.

7. A method for maintaining performance of a solid-state storage device, wherein the solid-state storage device is electrically connected to a host, and comprises a controller, a volatile memory, and a non-volatile memory, the method comprising:

utilizing the controller to divide the non-volatile memory into a plurality of functional regions;

utilizing the controller to set a functional-region weight value corresponding to a priority of each functional region, and to use a weighted round robin mechanism to perform a number of access commands for each functional region according to the functional-region weight value of each functional region;

utilizing the controller to set a submission-queue weight value corresponding to each submission queue within each functional region; and in response to a specific submission queue within a specific functional region among the plurality of functional regions being lower than a performance threshold, utilizing the controller to increase the submission-queue weight value corresponding to the specific submission queue to maintain the specific submission queue at a predetermined performance.

8. The method of claim 7, wherein the specific functional region among the plurality of functional regions has a high priority, and the specific submission queue within the specific functional region has a high priority.

9. The method of claim 7, wherein data access of each functional region within the non-volatile memory is controlled by one of a plurality of virtual machines running on the host.

10. The method of claim 7, further comprising: utilizing the controller to use a weighted round robin mechanism to perform a number of access commands corresponding to each submission queue within the specific functional region according to the submission-queue weight value corresponding to each submission queue within the specific functional region.

11. The method of claim 7, further comprising: utilizing the controller to calculate a data bandwidth while executing the access commands in each submission queue within each functional region to obtain a performance of each submission queue within each functional region.

12. The method of claim 11, further comprising: utilizing the controller to aggregate the performance of each submission queue within each functional region to derive a performance of each functional region.

* * * * *